US 9,559,880 B1

(12) United States Patent
Cirit et al.

(10) Patent No.: US 9,559,880 B1
(45) Date of Patent: Jan. 31, 2017

(54) EYE MODULATION FOR PULSE-AMPLITUDE MODULATION COMMUNICATION SYSTEMS

(71) Applicant: INPHI CORPORATION, Santa Clara, CA (US)

(72) Inventors: Halil Cirit, Santa Clara, CA (US); Karthik S. Gopalakrishnan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/061,874

(22) Filed: Mar. 4, 2016

(51) Int. Cl.
  H03K 7/02    (2006.01)
  H03K 9/02    (2006.01)
  H04L 25/08   (2006.01)
  H04L 25/49   (2006.01)
  H04B 10/54   (2013.01)

(52) U.S. Cl.
  CPC ............. H04L 25/08 (2013.01); H04B 10/541 (2013.01); H04L 25/4917 (2013.01)

(58) Field of Classification Search
  CPC .................. H03F 1/3247; H03F 1/3294; H03F 2201/3233; H04L 27/368; H04L 25/03343; H04B 10/504; H04B 10/564; H04B 10/58; H04B 10/50; H01S 5/0683
  USPC ......... 375/229–236, 295–297; 398/118–172, 398/182–201
  See application file for complete search history.

(56) References Cited

U.S. PATENT DOCUMENTS

| | | | | |
|---|---|---|---|---|
| 6,341,360 B1* | 1/2002 | Abdelilah | ......... | H04L 25/03057 375/233 |
| 6,665,336 B2* | 12/2003 | Abdelilah | ............. | H04L 1/0002 375/225 |
| 7,003,030 B2* | 2/2006 | Abdelilah | ............. | H04L 7/0062 375/234 |
| 7,181,146 B1* | 2/2007 | Yorks | ................... | H04B 10/504 398/195 |
| 7,945,884 B1* | 5/2011 | Goergen | ............... | G06F 13/409 370/351 |
| 8,050,318 B2* | 11/2011 | Phanse | ............... | H04B 10/6971 375/229 |
| 8,218,537 B1* | 7/2012 | Gui | ..................... | H04L 12/5696 370/369 |
| 8,848,774 B2* | 9/2014 | Zhong | ............... | H04L 25/03038 375/232 |
| 8,855,186 B2* | 10/2014 | Tan | ................... | H04L 25/03057 375/213 |
| 8,885,691 B1* | 11/2014 | Ren | ......................... | G05F 1/10 375/219 |

(Continued)

Primary Examiner — James M Perez
(74) Attorney, Agent, or Firm — Richard T. Ogawa; Ogawa P.C.

(57) ABSTRACT

The present invention is directed to communication systems. More specifically, embodiments of the present invention provide a technique and system thereof for performing eye modulation. Eye modulation is performed at the transmission side of a PAM communication system to compensate for distortion and non-linearity and generate an output waveform. Spacing among eye levels is adjusted by performing symmetric modulation using α parameter and asymmetric modulation using β parameter. A correction module measures the output waveform and sends feedback signals to a control module to adjust the α parameter and the β parameter. There are other embodiments as well.

20 Claims, 7 Drawing Sheets

(56) References Cited

U.S. PATENT DOCUMENTS

| | | | | |
|---|---|---|---|---|
| 8,930,795 B1* | 1/2015 | Lida | H04L 1/0036 | 714/776 |
| 8,958,504 B2* | 2/2015 | Warke | H04L 27/0014 | 375/235 |
| 8,983,291 B1* | 3/2015 | Broekaert | H04B 10/524 | 398/115 |
| 8,989,283 B1* | 3/2015 | Dabiri | H04L 5/1423 | 375/257 |
| 8,989,300 B1* | 3/2015 | Asmanis | H04B 10/524 | 375/286 |
| 9,020,022 B1* | 4/2015 | Warner | H04L 7/0058 | 375/232 |
| 9,100,232 B1* | 8/2015 | Hormati | H04L 25/03343 | |
| 9,143,171 B1* | 9/2015 | Chang | H04L 12/12 | |
| 9,191,245 B2* | 11/2015 | Tan | H04L 25/03057 | |
| 9,231,704 B1* | 1/2016 | Zhou | H04B 10/58 | |
| 9,237,047 B1* | 1/2016 | Zhang | H04L 25/061 | |
| 9,246,598 B2* | 1/2016 | Asmanis | H04B 10/588 | |
| 9,323,128 B1* | 4/2016 | Nagarajan | G02F 1/225 | |
| 9,337,993 B1* | 5/2016 | Lugthart | H04L 7/033 | |
| 9,374,217 B1* | 6/2016 | Forey | H03L 7/00 | |
| 9,450,848 B1* | 9/2016 | Wu | H04L 43/087 | |
| 2001/0035997 A1* | 11/2001 | Agazzi | H03M 1/0604 | 398/141 |
| 2002/0130256 A1* | 9/2002 | Macki | H04B 10/077 | 250/227.21 |
| 2005/0111852 A1* | 5/2005 | Mahgerefteh | G02B 5/281 | 398/187 |
| 2006/0018399 A1* | 1/2006 | Miyazakii | H04B 3/54 | 375/295 |
| 2008/0175594 A1* | 7/2008 | Bai | H04B 10/5167 | 398/140 |
| 2009/0243682 A1* | 10/2009 | Huang | H04L 25/0272 | 327/170 |
| 2009/0245341 A1* | 10/2009 | Graffouliere | H04L 25/0307 | 375/232 |
| 2010/0281089 A1* | 11/2010 | Vigoda | H04L 27/38 | 708/274 |
| 2012/0033760 A1* | 2/2012 | Zheng | H04L 1/0063 | 375/296 |
| 2012/0044983 A1* | 2/2012 | Kerr | H04L 25/03057 | 375/233 |
| 2013/0128943 A1* | 5/2013 | Doron | H03G 3/002 | 375/232 |
| 2014/0255037 A1* | 9/2014 | Shang | H04L 27/01 | 398/115 |
| 2014/0355662 A1* | 12/2014 | Kizer | H04L 25/0276 | 375/233 |
| 2015/0003505 A1* | 1/2015 | Lusted | H04L 25/4917 | 375/224 |
| 2015/0016497 A1* | 1/2015 | Aziz | H04L 25/03057 | 375/233 |
| 2015/0055694 A1* | 2/2015 | Juenemann | H04L 25/03057 | 375/233 |
| 2015/0071651 A1* | 3/2015 | Asmanis | H04B 10/524 | 398/141 |
| 2015/0071653 A1* | 3/2015 | Robinson | H04B 10/2507 | 398/161 |
| 2015/0085914 A1* | 3/2015 | Kizer | H04L 25/03885 | 375/233 |
| 2015/0132217 A1* | 5/2015 | Chang | A61K 47/48215 | 424/1.11 |
| 2015/0171963 A1* | 6/2015 | Bhoja | H04B 10/2575 | 398/115 |
| 2015/0222366 A1* | 8/2015 | Asmanis | H04B 10/588 | 398/186 |
| 2015/0249501 A1* | 9/2015 | Nagarajan | H04B 10/40 | 398/79 |
| 2016/0006596 A1* | 1/2016 | Dickson | H04L 27/364 | 375/298 |
| 2016/0191276 A1* | 6/2016 | Sakai | H04L 25/03057 | 375/233 |
| 2016/0269121 A1* | 9/2016 | Lee | H04B 10/541 | |

* cited by examiner

EYE MODULATION FOR PULSE-AMPLITUDE MODULATION COMMUNICATION SYSTEMS

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to communication systems.

Over the last few decades, the use of communication networks exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs. For high-speed data communication applications, pulse-amplitude modulation (PAM) technique is often used. Among other things, PAM ($2^n$, with n>1) provides an improved spectral efficiency that allows for higher data throughput on communication media. For various applications, eye modulation is performed.

Over the past, there have been many types of communication systems and methods. Unfortunately, they have been inadequate for various applications. Therefore, improved systems and methods are desired.

BRIEF SUMMARY OF THE INVENTION

The present invention is directed to communication systems. More specifically, embodiments of the present invention provide a technique and system thereof for performing eye modulation. Eye modulation is performed at the transmission side of a PAM communication system to compensate for distortion and non-linearity and generate an output waveform. Spacing among eye levels is adjusted by performing symmetric modulation using $\alpha$ parameter and asymmetric modulation using $\beta$ parameter. A correction module measures the output waveform and sends feedback signals to a control module to adjust the $\alpha$ parameter and the $\beta$ parameter. There are other embodiments as well.

According to an embodiment, the present invention provides a communication system that includes a control module that is configured to generate a first control signal for adjusting an $\alpha$ parameter and a second signal for adjusting a $\beta$ parameter. The $\alpha$ parameter and the $\beta$ parameter are determined based on eye-modulation characteristics. The system also includes a PAM transmitter that is configured to perform eye-modulation on a source data and generate an output waveform using the $\alpha$ parameter and the $\beta$ parameter. The $\alpha$ parameter is used to adjust a middle eye-height. The $\beta$ parameter is used to adjust a top eye-height and a bottom eye-height. The source data include MSB data and LSB data. The system additionally includes a correction module that configured to measure eye-modulation characteristics. The eye-modulation characteristics include distortion and signal-to-noise ratios.

According to another embodiment, the present invention provides a method for calibrating eye-modulation parameters in a PAM4 communication system. The method includes retrieving calibration data for determining an $\alpha$ parameter and a $\beta$ parameter. The method also includes performing PAM4 eye-modulation with four eye levels to generate an output waveform. The four eye levels are separated by a top eye height, a middle eye height, and a bottom eye height. The method further includes measuring the eye heights and signal-to-noise ratios of the output waveform. The signal-to-noise ratios are corresponding to the eye heights. The method additionally includes adjusting the $\alpha$ parameter to equalize the middle eye height relative to the top eye height and the bottom eye height. The method also includes adjusting the $\beta$ parameter to equalize signal-to-noise ratios by changing the top eye height and the bottom eye.

According to yet another embodiment, the present invention provides a communication system that includes a control module being configured to generate a first control signal for determining an $\alpha$ parameter and a second signal for determining a $\beta$ parameter. The $\alpha$ parameter and the $\beta$ parameter are determined based on eye-modulation characteristics. The control module includes a memory for storing calibration data. The system additionally includes a PAM4 transmitter that is configured to perform eye-modulation on the calibration data and generate an output waveform using the $\alpha$ parameter and the $\beta$ parameter. The output waveform is modulated with four eye levels. The $\alpha$ parameter is used to adjust a middle eye-height. The $\beta$ parameter is used to adjust a top eye-height and a bottom eye-height. The calibration data include MSB data and LSB data. The output waveform is outputted by an optical driver. The system also includes a correction module that is configured to measure eye-modulation characteristics. The eye-modulation characteristics include distortion and signal-to-noise ratios.

It is to be appreciated that embodiments of the present invention provide many advantages. By performing symmetric modulation in a PAM communication system, distortion in signal chain can be compensated without affecting DC swing. Asymmetric eye modulation, which can be implemented in the same PAM communication system, allow the transmit signal to maintain substantially the same signal-to-noise ratio for the communication channels. It is advantageous, as provided according to embodiments of the present invention, eye modulation for compensating data path distortion and nonlinearity is performed before data transmission, and therefore can be highly efficient and reliable. It is to be appreciated that eye modulation techniques and systems thereof can be implemented in conjunction with existing systems and manufacturing processes. There are other benefits as well.

The present invention achieves these benefits and others in the context of known technology. However, a further understanding of the nature and advantages of the present

DETAILED DESCRIPTION OF THE INVENTION

Figure 1:
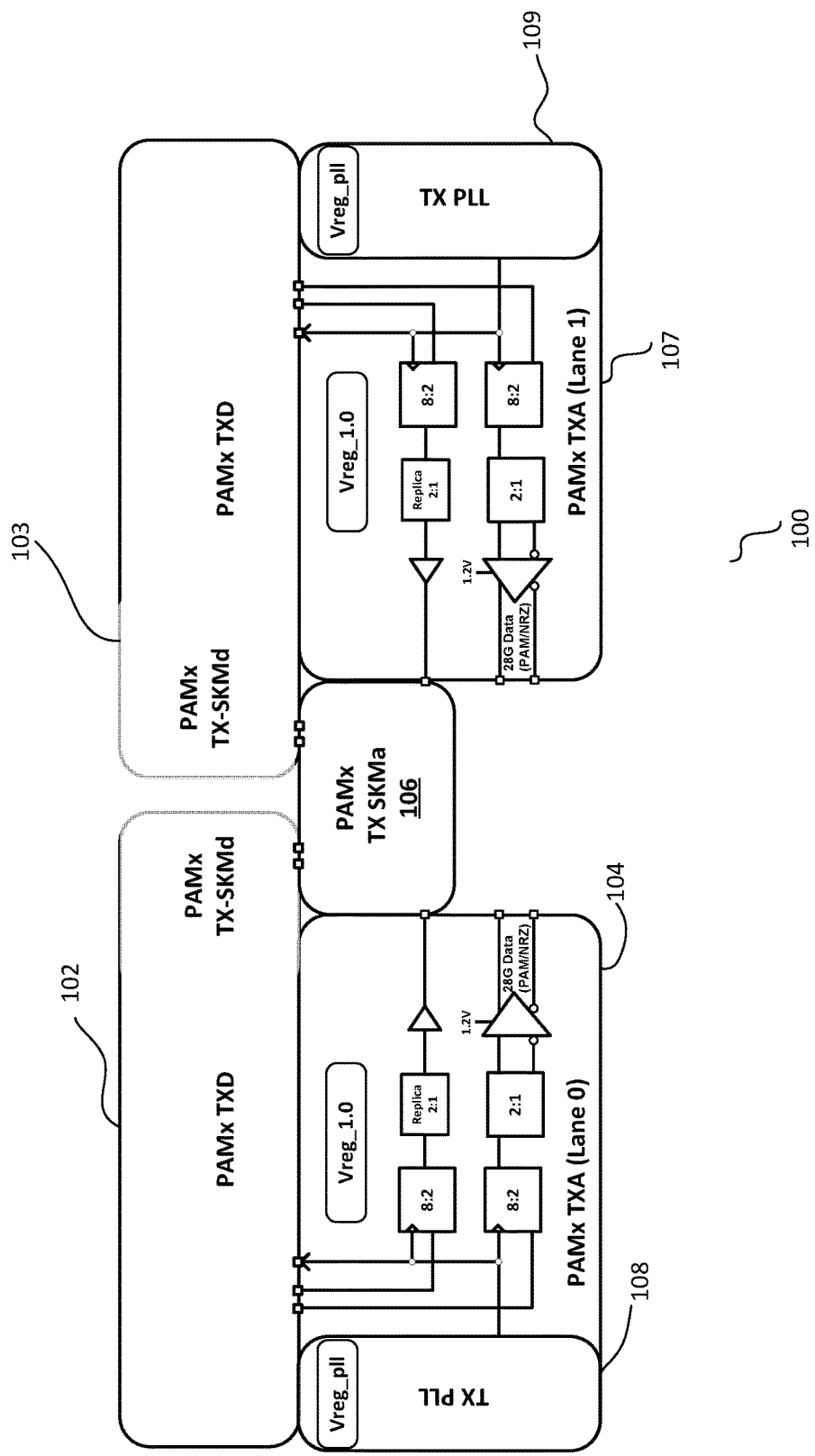
FIG. 1 is a simplified diagram illustrating a PAM communication system 100 according to an embodiment of the present invention.

The present invention is directed to communication systems. More specifically, embodiments of the present invention provide a technique and system thereof for performing eye modulation. Eye modulation is performed at the transmission side of a PAM communication system to compensate for distortion and non-linearity and generate an output waveform. Spacing among eye levels is adjusted by performing symmetric modulation using α parameter and asymmetric modulation using β parameter. A correction module measures the output waveform and sends feedback signals to a control module to adjust the α parameter and the β parameter. There are other embodiments as well.

As data communication advances toward a faster speed, pulse-amplitude modulation (PAM) techniques have been widely adopted. In PAM communication systems, data are encoded in the amplitude of a series of signal pulses. It is an analog pulse modulation scheme in which the amplitudes of a train of carrier pulses are varied according to the sample value of the message signal. Demodulation is performed by detecting the amplitude level of the carrier at every symbol period. For example, in a PAM4 modulation system, four amplitude levels are used for each pulse, thereby allowing each pulse to represent up to four values that correspond to the four amplitude levels. Ideally, for accurate data transmission, amplitude levels are evenly spaced and kept linear both at the transmitting end and the receiving end. Unfortunately, signals are often distorted when transmitted over a transmission link. More specifically, distortion in the signal chain significantly impacts performance in PAM based systems. For example, distortion is often caused by compression in optical communication data path. In addition, signal non-linearity is often another problem. More specifically, in optical systems, noise in optical system tends to increase with power. For example, noise of low power level (e.g., "00 . . . 0") is lower than noise of high power level (e.g., "11 . . . 1"). It is to be appreciated that by compensating for different amount of noise at different power levels, data can be transmitted more accurately and efficiently compared to systems without compensation.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a PAM communication system 100 according to an embodiment of the present invention. This diagram is merely an example, which should not unduly limit the scope of the claims. One of ordinary skill in the art would recognize many variations, alternatives, and modifications. As shown in FIG. 1, data are transmitted between communication module 104 and communication module 107. More specifically, communication module 104 works in conjunction with module 102 and PLL 108; communication module 107 works in conjunction with module 103 and PLL 109. When communication module 104 transmits data to communication module 107 (or vice versa), a skew management module 106 is also used to facilitate data alignment. For example, two 8-bits data lanes are combined to provide a 16-bits data lane, and module 106 facilitates the alignment of two lanes.

The TXD modules 102 and 103 provide digital functions. In a specific embodiment, each of the TXD modules is used for receiving 2 sets of 40-bit data word (MSB and LSB) and serializing it to 2 sets of 8 bits, as required for NRZ or PAM4 modes. Additionally, TXD modules generate the word clock output to the core logic. The TXD modules 102 and 103 are also responsible for the managing the skew on the high-speed data transmission across dual-NRZ streams, in conjunction with the skew management module 106. In various implementations, the TXD modules 102 and 103 also implement all the MDIO registers for the TX as well as providing overrides for all the voltage regulators and TX PLL configuration and status. For example, the PAM communication system includes a Management Data Input/Output (MDIO) for providing serial data communication.

The TXA modules 104 and 107 are configured to provide mixed digital and analog functions, which include serializing MSB and LSB parallel 8-bits wide words into a serial bit stream. For example, when serializing MSB and LSB words, skew management module 106 helps align the MSB and LSB words, details of which are provided below. In certain implementations, TXA modules 104 and 107 are configured to drive a 100Ω differential load in PAM4 mode, and they are adapted to apply the pre and post cursor data. When operating in NRZ mode, the TXA modules provide similar functions on the MSB stream, and the LSB stream is used to carry data (clock-patterns) for skew management (if enabled).

The PLL modules 108 and 109 provide clock signals. For example, the PLL modules use a clock recovered from the receiver as a reference to generate the 14G 2-phase clocks needed for the TXA modules. In various implementations, the reference clock for the TX PLL modules 108 and 109 is primarily the recovered clock from the partnered transceiver. This keeps the transmission frequency locked to the frequency of incoming data, which may be asynchronous to local reference frequency. For example, PLL module 108 and 109 generate two phases of 2UI clock for the TXA modules, where each phase is offset by 1UI. The TXA module output divided 8UI clock to the TXD modules, which in turn generate a 40UI clock output to the core used to generate new "data_in" data for transmission. TXD modules 102 and 103 provide the first stage of interleave and generate 8-bits wide data to the TXA modules, where the final 8:1 interleave is performed before transmission. TXA modules 104 and 107 also provide a finite impulse response (FIR) function for line equalization, with pre and post cursor compensation levels set from registers contained in TXD modules. In certain implementations, TXD modules comprise fuse-able registers for providing trimming of the voltage regulators, phase tuning of the clocking and output impedance of the TXA.

As shown in FIG. 1, the physical placement of the TXD logic (e.g., TXD modules 102 and 103) in the transmitter means that the signals between the TXD and the core logic need to be re-buffered through a "routing channel" to maintain acceptable slew rates over the routing distance. This is also true of signals running between the TXD modules 102 and 103 and the TX PLL module 108 and 109. According to an exemplary implementation, signals between TXD modules and TXA modules have critical 3.5 GHz timing and the placement is such that these can be routed directly. For example, logic of the TXD modules 102 and 103 can be used in multiple transmitter topologies for different implementations, and the routing channels can be created in separate levels of hierarchy to allow different routing to be accommodated while keeping the substantially the same TXD layout as shown in FIG. 1. In a specific embodiment, a "tx_routing" cell is used to contain buffers and signal routing between the TXD modules and the core logic. A "tx_pll_routing" cell is provided to contain the buffering between the TXD modules and the TX PLL modules. A "tx_txd_pnr" cell is used at the transmission level as a wrapper round the "tx_txd" digital logic and the two routing channels.

Figure 2:
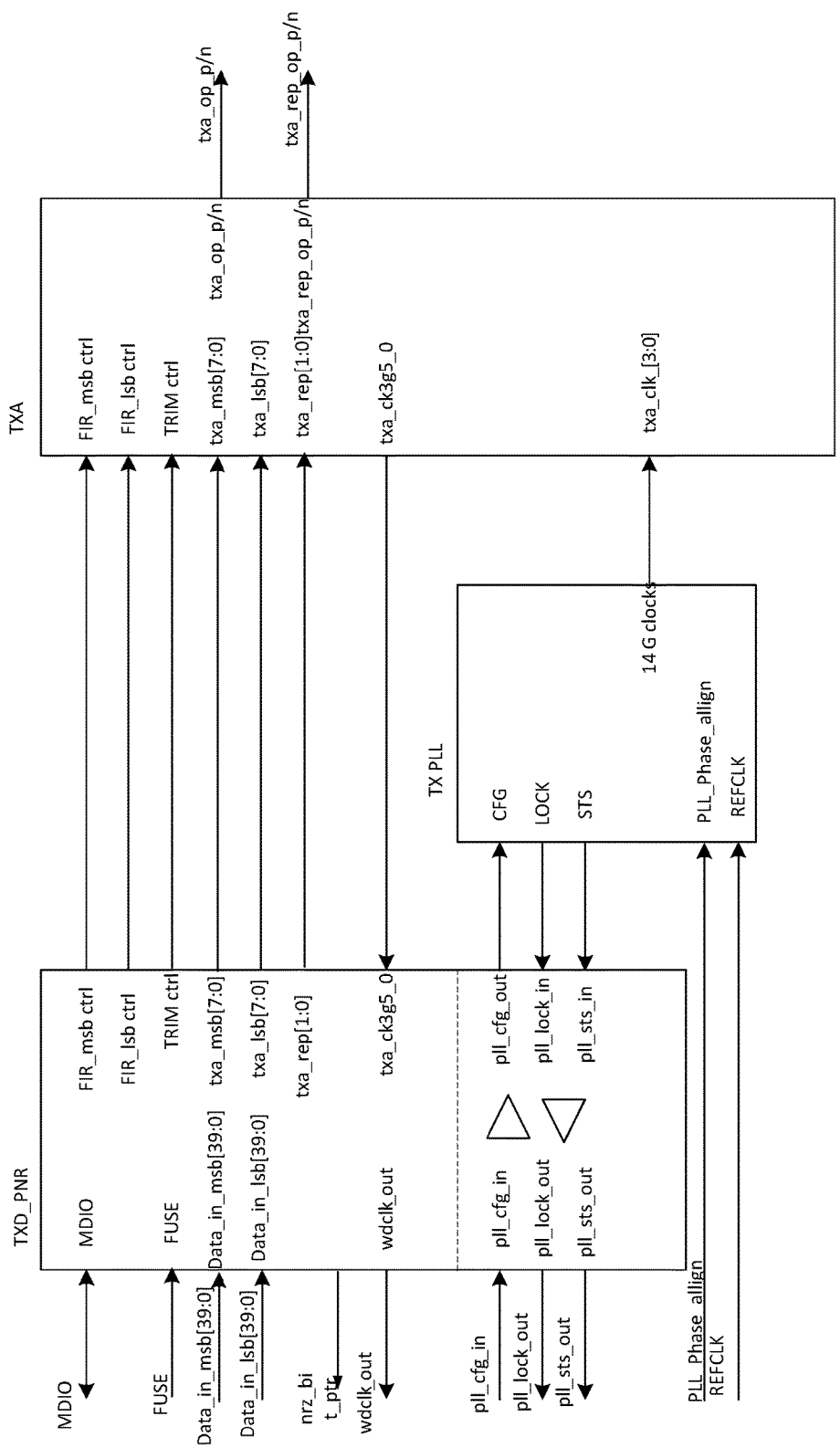
FIG. 2 is a simplified diagram illustrating a transmitter according to an embodiment of the present invention.

FIG. 2 is a simplified diagram illustrating a transmitter according to an embodiment of the present invention. This diagram is merely an example, which should not unduly limit the scope of the claims. One of ordinary skill in the art would recognize many variations, alternatives, and modifications. As can be seen in FIG. 2, the TXD module provides digital control signals for the TXA module, and clock signal is provided by the TX PLL module.

A primary function of the TXD is to capture 2 pairs of 40-bit wide data from the core logic, MSB (e.g., Data_in_msb[39:0]) and LSB (e.g., Data_in_lsb[39:0]), and multiplex this down to 2 pairs of 8-bit wide data for final transmission by the TXA circuit in PAM4 mode. A "word clock" ("wdclk_out") signal is generated to provide new data from the core by dividing the high speed txa_ck3g5_0 clock from the TXA. In a specific embodiment, different dividing ratios are used at different transmit line rates to maintain the wdclk_out work clock at approximately 700 MHz. In addition to the mission mode divider, a clock control module is used to generate a fixed number of clock pulses in ATPG mode to support at-speed transition fault testing.

During a PAM4 transmission mode, the TXD module generates 2 separate 8-bits data patterns, "txa_msbdata" and "txa_lsbdata". During an NRZ mode TXD, if the skew management is disabled, the MSB data path is used to multiplex the pattern from the core "msbdata_in [39:0]" down to the 8-bit output on "txa_msbdata" and the LSB data path is powered down. If, however, the skew management function is enabled, the LSB data path carries data from the skew management pattern generator.

As seen in FIG. 2, the TXD module contains a block of MDIO addressable registers for configuration and control of both the TXD and TXA modules. In certain embodiments, many aspects of the TXA module are fuse trimmed, and each trim value is also override-able with an MDIO register. In various implementations, the PLL module is configured to generate the high speed TXA clocks (e.g., 14 GHz clock). As shown, configuration and status buses for TX PLL module are routed through TXD to provide buffering and isolation from the core logic and enable the loading to be checked.

Depending on the implementation, the logical units can be implemented in various ways. For example, logical units can be implemented using various types of digital logic devices. Among other features, a log device is configured to provide compensation for eye-modulation. In various embodiments, TXD and TXA module work close with each other for providing eye-modulation compensation. Output of TXA is modified by a correction module.

In various embodiments, the TXA module can operate in both NRZ and PAM4 modes of operations. For example, the TXA module implements three high-speed driver bricks. One takes the LSB data patterns and the other two take the MSB data patters. These high-speed driver bricks implement 1-UI spaced 3-tap FIR filtering, wherein the pre-tap comprises 8× of settings, main tap comprises 32× of settings, and post tap comprises 16× of settings to generate fine tuning at the driver output. For example, pre and post taps can be used as main tap as well. In various embodiments, the main tap can take LSB or MSB data to generate PAM4 eye modulation. For example, eye modulation is compensated so that the eye-levels at the receiving end of the data transmission are substantially even.

Figure 3:
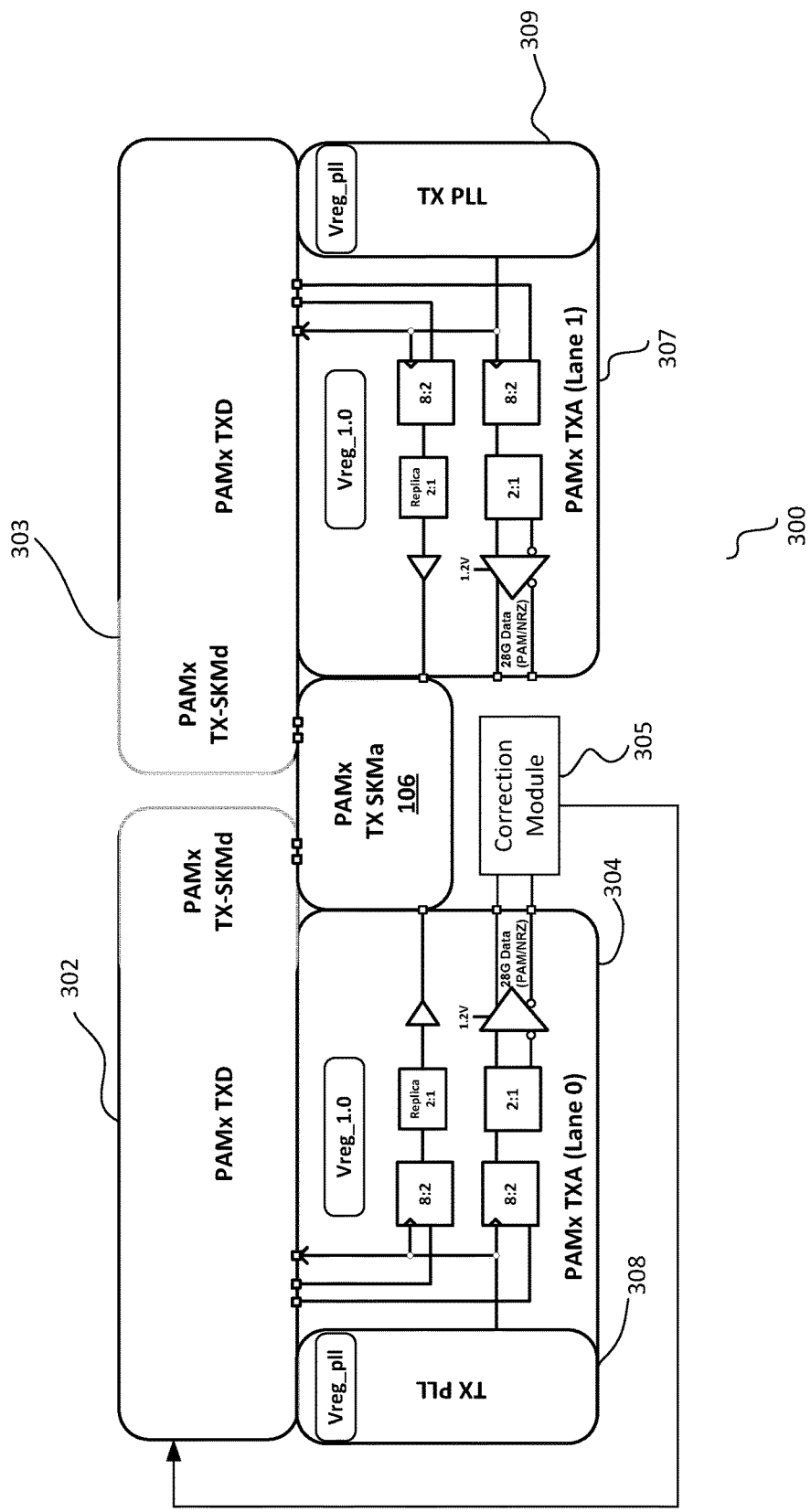
FIG. 3 is a simplified diagram illustrating a PAM communication system 300 with compensated eye-modulation according to an embodiment of the present invention.

FIG. 3 is a simplified diagram illustrating a PAM communication system 300 with compensated eye-modulation according to an embodiment of the present invention. This diagram is merely an example, which should not unduly limit the scope of the claims. One of ordinary skill in the art would recognize many variations, alternatives, and modifications. As shown in FIG. 3, system 300 includes correction module 305 that processes the output from the TXA module 304. More specifically, correction module 305 provides the monitored output of the TXA module 304 to the TXD module 302, and together they determine compensation parameters for eye modulation. Compensation parameters include $\alpha$ parameter for providing symmetric eye modulation and $\beta$ parameter for providing asymmetric eye modulation. For example, the TXD module 302 provides digital functions, which include serializing and aligning data for high-speed transmission. As described below, for eye-modulation compensation, $\alpha$ and $\beta$ parameters used in the TXA module are adjusted to provide the compensation needed. In various embodiments, TXD module 302 is specifically configured to, using the correction module 305 as a part of a feedback loop, determine the appropriate $\alpha$ and $\beta$ parameters. For example, the correction module 305 measures various signal characteristics (e.g., distortion, SNRs, etc.) of the signal transmitted from the TXA module 304. For example, the correction modules 307 measures SNRs and data distortion of the data from the TXA module 304, and the SNRs and data distortion information is then communicated back to the TXD module 302, which adjusts the $\alpha$ and $\beta$ parameters accordingly to obtain the desired eye modulation spacing (or height). In a specific embodiment, the communication 300 comprises a communication channel for transferring information related to spacing of eye modulation.

According to various embodiments, the TXD module 302 comprises calibration data for determining $\alpha$ and $\beta$ parameters. For example, as system 300 starts and initiates various parameters, $\alpha$ and $\beta$ parameters are calibrated to minimize distortion and equalize eye-level spacing. In a specific embodiment, signal with known distortion is transmitted and measured, and the TXD module 302 uses the distortion information to calibrate $\alpha$ parameter; signal with known signal and noise characteristics is transmitted and measured, and the TXD module 302 uses the signal and noise characteristics to calibrate $\beta$ parameter. Once calibrated, $\alpha$ and $\beta$ parameters are used in eye-modulation when transmitting data, where $\alpha$ parameter provides symmetric eye-modulation, and $\beta$ parameter provides asymmetric eye-modulation.

Figure 4A:
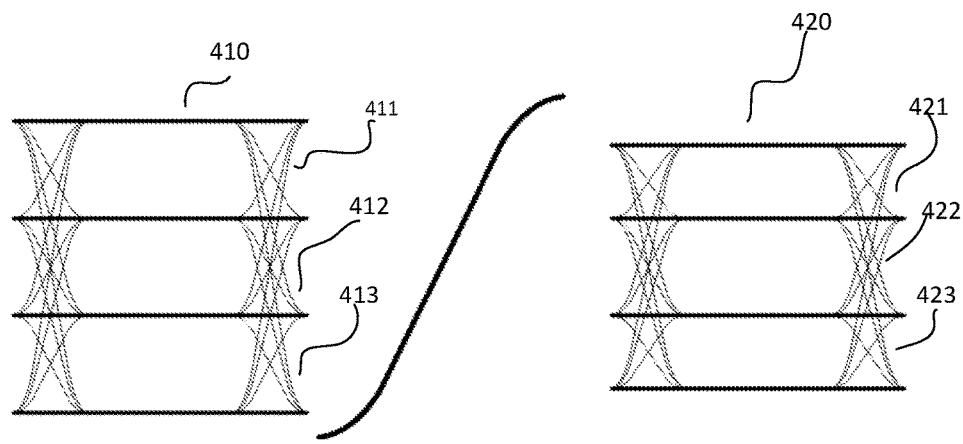
FIG. 4A is a simplified diagram illustrating a symmetrical eye-modulation. Graph 410 shows that before transmission, eye module levels are substantially even.

FIG. 4A is a simplified diagram illustrating a symmetrical eye-modulation. Graph 410 shows that before transmission, eye module levels are substantially evenly spaced. More specifically, eye level spacing (or "eye height") at 411, 412, and 413 is substantially the same. For example, bottom eye level spacing (or eye height) 413 corresponds the spacing between the bottom level and the level next to the bottom level. However, eye level spacing is changed after transmission, as shown in graph 420, which represents eye levels received by the receiver. More specifically, during the transmission, compression occurs and causes distortion in the data path. As a result of this distortion, spacing at 421 and 423 are compressed, approximately by the same amount, and this is referred to as symmetric compression. More specifically, the spacing at 421 and 423 is less than the spacing at 422. As explained above, for accurate data transmission and decoding, it is desirable to have substantially even eye modulation levels at the receiver. In various embodiments of the invention, eye modulation levels are compensated prior to transmission.

Figure 4B:
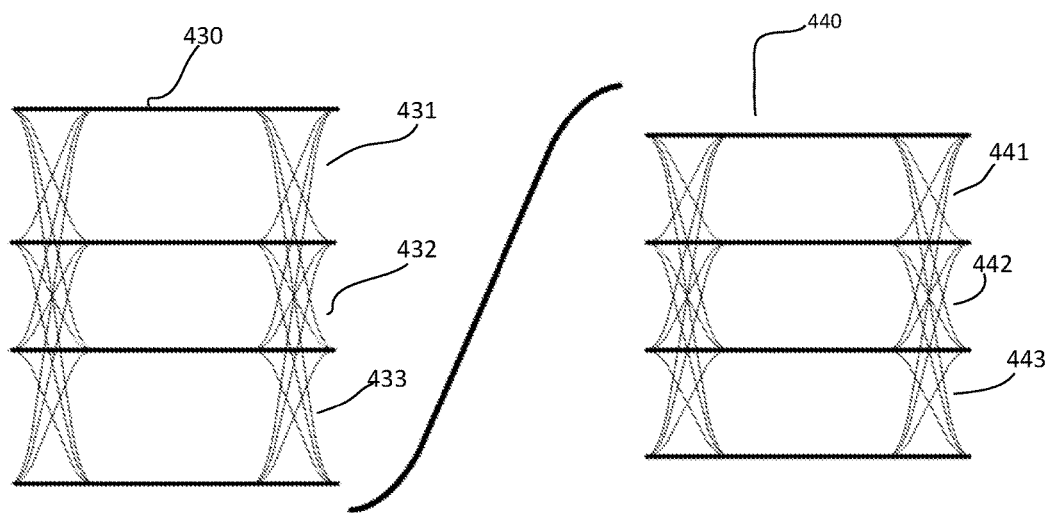
FIG. 4B is a simplified diagram illustrating symmetric eye-modulation according to an embodiment of the present invention.

FIG. 4B is a simplified diagram illustrating symmetric eye-modulation according to an embodiment of the present invention. This diagram is merely an example, which should not unduly limit the scope of the claims. One of ordinary skill in the art would recognize many variations, alternatives, and modifications. As can be seen in FIG. 4B, eye levels of graph 430 are compensation prior to transmission. Since spacing at 431 and 433 are distorted and compressed during the transmission process, eye level spacing of 432 are compensated and the spacing of 431 and 433 is greater than the spacing of 432. For example, during the compensation process, eye level of 432 is modulated while the DC swing of the driving signal is maintained. As can be seen in graph 440 illustrating the eye levels after transmission, spacing of 431 and 433 is compressed, and the resulting spacing of 441 and 443 (outer levels) matches the spacing of 442 (middle level), as the spacing of 442 was compensated before transmission. For example, $\alpha$ parameter is used to compensate spacing of 442 for symmetric eye-modulation.

Figure 5A:
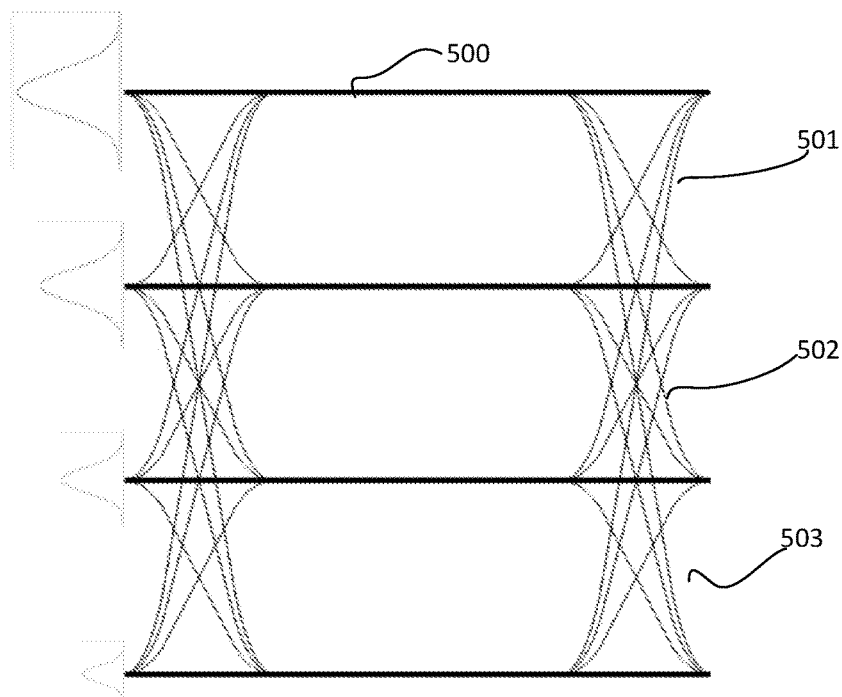
FIGS. 5A and 5B are simplified diagram illustrating non-symmetrical modulation according to embodiments of the present invention.
Figure 5B:
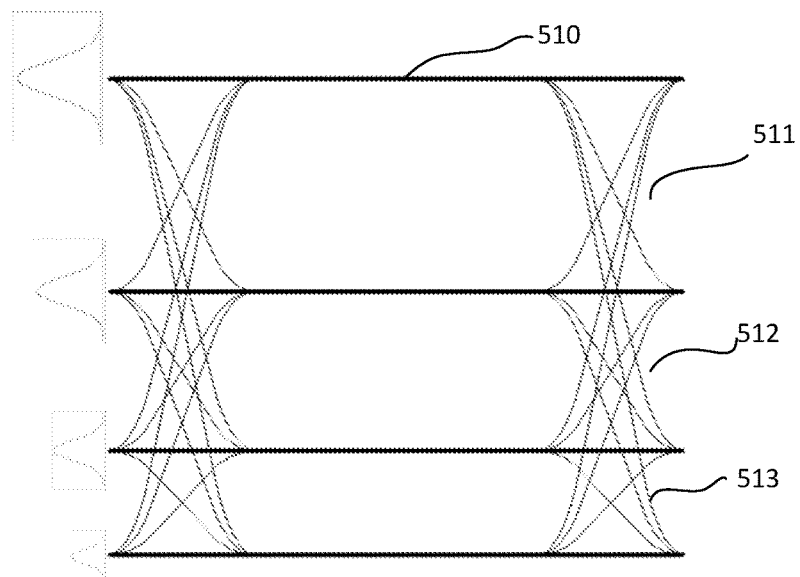

In addition to the symmetric distortion, which can be compensated by modulating the middle eye level as illustrated in FIGS. 4A and 4B, there can be non-symmetrical distortion as well. For example, during the transmission process, amount of noise in optical communication systems tends to increase with power. As far as transmission is concerned, that means eye-levels with high power (e.g., 111 . . . 1) have a greater amount of noise than the eye-levels with low power (e.g., 000 . . . 0). This type of power-level related distortion is not symmetrical. FIG. 5A shows a graph with equal eye levels prior to transmission. After transmission, eye levels are likely to change. More specifically, signal-to-noise ratio (SNR) of the top eye level is likely to be less than the SNR of the middle eye level, which in turn is less than the SNR of the bottom eye level, as a function of noise in power. It is to be appreciated that to adjust for noise at different eye levels, eye levels and spacing thereof are compensated accordingly. FIG. 5B illustrates a graph with non-symmetric eye modulation according to an embodiment of the present invention. As can be seen in FIG. 5B, spacing of the top eye level is greater than the spacing of the middle eye level, and the spacing of the middle eye level is greater than the spacing of the bottom eye level. The different spacing corresponds to different SNR at different eye levels, where the high power levels gets more spacing to compensate for the high level of noise. After transmission, the eye levels are evened out, where the SNR levels for top, middle, and bottom levels are about the same. For example, $\beta$ parameter of the transmission system is adjusted to provide non-symmetric eye modulation.

FIGS. 5A and 5B are simplified diagram illustrating non-symmetrical modulation according to embodiments of the present invention. These diagrams merely provide an example, which should not unduly limit the scope of the claims. One of ordinary skill in the art would recognize many variations, alternatives, and modifications. In FIG. 5A, eye-modulation graph 500 shows that eye level heights 501, 502, and 503 are substantially even. For evenly spaced eye levels separated by the substantially equal eye heights, respective SNRs are different. This is because, as explained above, noise in optical system increases with power. More specifically, SNR for the top eye level and separated by eye level spacing 501 from its adjacent eye level, is less than the SNR for bottom eye height 503 separating the bottom two eye level. For example, in a PAM 4 system, eye level 503 represents a separation between "00" and "01", which has lower noise of eye level 501 that represents a separation between "11" and "10".

To equalize the SNRs among the eye levels, therefore, the eye level with greater power should be compensated with eye level spacing that the eye level with lower power. In FIG. 5B, the eye-modulation graph 510 shows that top eye level has greater spacing 511 than middle eye height 512, and middle eye height 512 has greater spacing than the bottom eye height 513. The greater spacing at eye height 511 is specifically calibrated to compensate for the relatively high noise associated with high power (e.g., "11", "111", etc.), and the smaller spacing at eye height 513 is calibrated for relatively low noise associated with low power (e.g., "00", "000", "001", etc.) By making the spacing of top eye height 511 greater than the spacing of middle eye height 512, and the spacing of middle eye height 512 greater than the bottom eye height 513, the SNRs among different eye levels can be equalized. For example, the non-symmetric eye-modulation shown in eye modulation graph 510 provides different eye level heights that correspond to equalized SNRs. The relatively greater spacing of the eye level 511 corresponds to the relatively higher amount of noise, as compared to the relative smaller spacing of eye level 512 that corresponds to relative lower amount of noise. In various embodiments, the actual eye level heights of the eye levels are calibrated and determined using a feedback loop. For example, the correction module 305 in FIG. 3 determines noises amount associated with each of the eye levels, and in response the TXD module 302 changes eye-modulation parameters according to equalize the SNRs associated with each of the eye levels.

Figure 6:
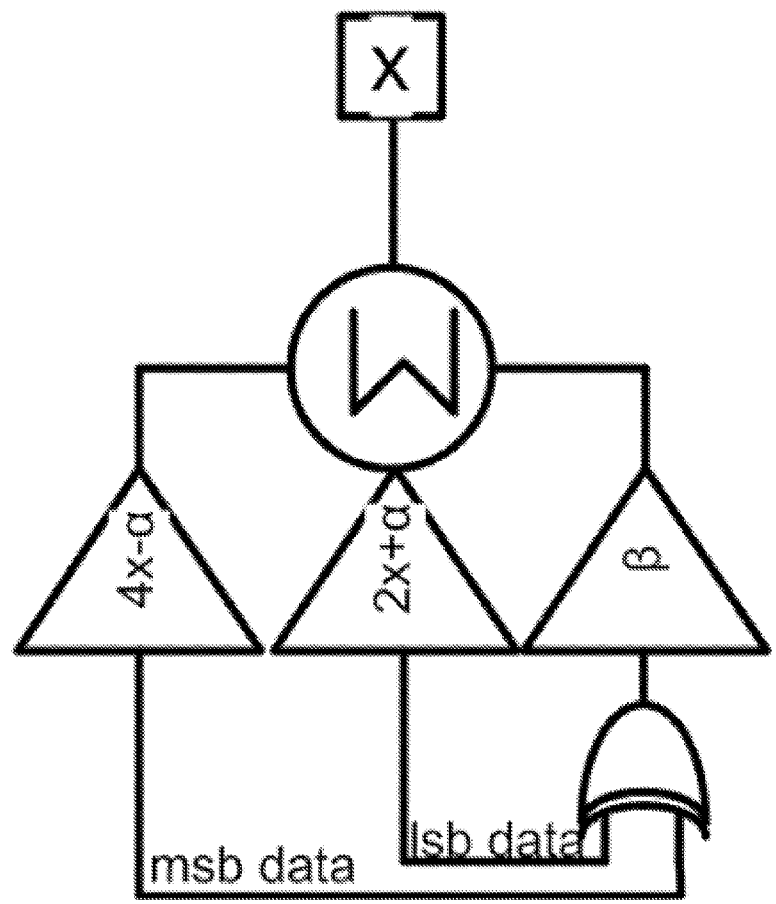
FIG. 6 is a simplified diagram illustrating a compensation device for eye modulation according to embodiments of the present invention.

FIG. 6 is a simplified diagram illustrating a compensation device for eye modulation according to embodiments of the present invention. This diagram is merely an example, which should not unduly limit the scope of the claims. One of ordinary skill in the art would recognize many variations, alternatives, and modifications. In various embodiment, the device illustrated in FIG. 6 is a transmitter in data communication. For example, the transmitter in FIG. 6 is implemented as a part of the TXA module 304. As shown in FIG. 6, LSB and MSB data are modified by $\alpha$ and $\beta$ parameters. More specifically, both output and eye level spacing can be adjusted by $\alpha$ and $\beta$ parameters. Table 1 below is an exemplary scheme for compensating eye level spacing:

TABLE 1

| MSB | LSB | MSB XOR LSB | output | eye level spacing |
|---|---|---|---|---|
| $4x - \alpha$ | $2x + \alpha$ | $(-\beta)$ | | |
| 1 | 1 | −1 | $(6x + \beta)$ | |
| 1 | −1 | 1 | $(2x - 2\alpha - \beta)$ | $4x + 2\alpha + 2\beta$ |
| −1 | 1 | 1 | $(-2x + 2\alpha - \beta)$ | $4x - 4\alpha$ |
| −1 | −1 | −1 | $(-6x + \beta)$ | $4x + 2\alpha - 2\beta$ |

It is to be appreciated that depending on the specific implementation, other parameter setting can be used as well. For example, $\alpha$ parameter is used to provide symmetric eye modulation. By setting $\beta$ parameter to zero, the inner or middle eye spacing relative to the outer eye spacing can be adjusted. For example, symmetric eye modulation refers to modulating the inner or middle eye height relative to the outer (top and bottom) eye heights. It is to be appreciated that by changing the inner eye height using $\alpha$ parameter, equalization settings are not changed. Referring to Table 1, when $\beta$ parameter is set to zero, a change in $\alpha$ parameter does not change eye level spacing of MSB/LSB pair (1 1), the pairs (1 −1) and (−1 −1) of top and bottom eye level spacing is changed by the same amount according to formulae $4x+2\alpha 2\beta$ ($2\beta$ is zero here), and middle eye level spacing is changed according to formula $4x-4\alpha$. For example, to reduce the spacing of middle eye level (−1 1) relative to that of the top and middle eye levels, a positive $\alpha$ reduces the middle eye level spacing for a factor of $4\alpha$ and increases the top and bottom eye level spacing by a factor of $2\alpha$. Conversely, to increase the spacing of middle eye level (−1 1) relative to that of the top and middle eye levels, a negative $\alpha$ increases the middle eye level spacing for a factor of $4\alpha$ and reduces the top and bottom eye level spacing by a factor of $2\alpha$. The $\alpha$ parameter is thus used for symmetric eye modulation and adjusting middle (inner) eye level spacing relative to top and bottom eye level spacing.

The $\beta$ parameter is used for asymmetric eye modulation. For example, by using the $\beta$ parameter to adjust the eye heights between different levels of PAM4 modulation, the SNRs of the four output eye levels are equalized at the output of optical driver. Referring to Table 1, when $\alpha$ parameter is set to zero, a change in $\beta$ parameter does not change eye level spacing of MSB/LSB pair (1 1) and middle eye level (−1 1). According to various embodiments, the spacing of the top eye level (1 −1) and the bottom eye level (−1 −1) are adjusted by changing the $\beta$ parameter. As illustrated in Table 1, middle eye level spacing is defined by forma $4x-4\alpha$, and changes of $\beta$ parameter does not affect the middle eye level. Heights or spacing of the top eye level and the bottom eye level are defined by formula $4x+2\alpha\pm2\beta$. For example, a positive $\beta$ value increases the spacing for the top eye level (1 −1) by a factor of $2\beta$ and reduces the spacing of the bottom eye level (−1 −1) by a factor of $2\beta$, and spacing for the middle eye level is unchanged. Similarly, a negative $\beta$ value decreases the spacing for the top eye level (1 −1) by a factor of $2\beta$ and increases the spacing of the bottom eye level (−1 −1) by a factor of $2\beta$, and spacing for the middle eye level is unchanged. It is to be appreciated by adjusting $\beta$ parameter, asymmetric eye modulation can be performed. Typically, the $\beta$ parameter value is positive, as the spacing or height of the type eye level needs to be greater than the spacing of other eye levels, which is due to the relative higher noise associated with the higher power.

Both $\alpha$ and $\beta$ parameters can be determined through a feedback loop, as illustrated in FIG. 3. Depending on the implementation, $\alpha$ and $\beta$ parameters can be calibrated individually or together. For example, the correction module 305 determines a distortion associated with the data path. The TXD module 302 performs eye modulation by adjusting the $\alpha$ parameter until spacing or height of eye levels are substantially even. Similarly, the correction module 305 can be configured to measure the SNRs associated with each of the eye levels, and the TXD module 303 adjusts the $\beta$ parameter to provide asymmetrical eye modulation to equalize the SNRs associated with spacing or heights of the eye levels.

Figure 7:
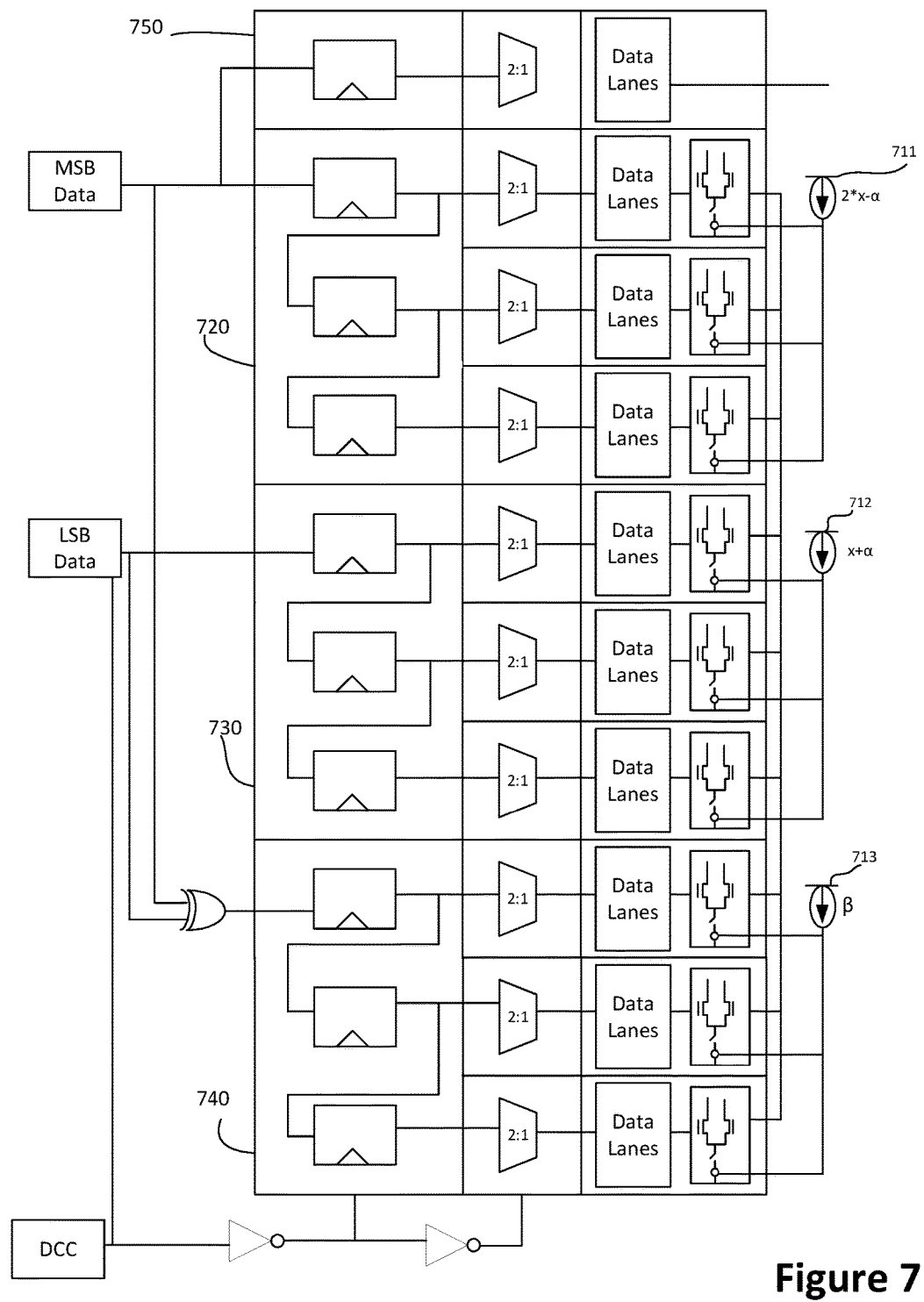
FIG. 7 is a simplified diagram illustrating an architecture for providing eye modulation according to embodiments of the present invention.

FIG. 7 is a simplified diagram illustrating an architecture for providing eye modulation according to embodiments of the present invention. This diagram is merely an example, which should not unduly limit the scope of the claims. One of ordinary skill in the art would recognize many variations, alternatives, and modifications. As shown in FIG. 7, data paths with eye modulation are provided in sections 720, 730, and 740. The data path 750 provides a replica data path. At section 720, eye modulation is performed by the modulator 711 to modulate MSB data by a function of $4x-\alpha$. At section 730, eye modulation is performed by the modulator 712 to modulate of LSB data by a function of $2x+\alpha$. At section 730, asymmetrical eye modulation is performed by the modulator 713 to modulate both MSB data and LSB data by a function P. In various embodiments, a control module generates control signals based on the output signal that is a part of the control feedback loop, and the control signals adjust α and β parameters accordingly, until an equalized output is achieved. In a specific embodiment, the feedback loop also includes data from the receiver. Various characteristics (e.g., distortion, SNR, etc.) of the eye-modulated signal are measured by a correction module and provided to the controller module that adjusts α and β parameters. For example, distortion characteristic of the eye-modulated signal is used in determining α parameter that adjusts the inner or middle eye level; relative SNRs of the output signal are used in determining β parameter that provides asymmetric eye-modulation that equalizes eye level spacing.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A communication system comprising:
  a control module being configured to generate a first control signal for adjusting an α parameter and a second signal for adjusting a β parameter, the α parameter and the β parameter being determined based on eye-modulation characteristics;
  a PAM transmitter being configured to perform eye-modulation on a source data and generate an output waveform using the α parameter and the β parameter, the α parameter being used to adjust a middle eye-height, the β parameter being used to adjust a top eye-height and a bottom eye-height, the source data comprising MSB data and LSB data, the top eye-height separating a first eye level and a second eye level, the middle eye-height separating the second eye level and a third eye level, and the bottom eye-height separating the third eye level and a fourth eye level; and
  a correction module being configured to measure eye-modulation characteristics, the eye-modulation characteristics including distortion and signal-to-noise ratios.

2. The system of claim 1 wherein the PAM transmitter comprises an optical driver, the signal-to-noise ratios of the output waveforms being measured from an output of the optical driver.

3. The system of claim 1 wherein adjusting the middle-eye height is associated symmetric eye-modulation for compensating distortion in a data path.

4. The system of claim 1 wherein adjusting the top eye-height and the bottom eye height is associated asymmetric eye-modulation for equalizing signal-to-noise ratios corresponding to the first, second, third, and fourth eye levels.

5. The system of claim 1 wherein the PAM transmitter adjusts the α parameter using the first signal and the β parameter using the second signal.

6. The system of claim 1 further comprising a phase-lock loop for providing clock signal to the PAM transmitter.

7. The system of claim 1 wherein the control module comprises a memory for storing calibration data used for calibrating the α parameter and the β parameter.

8. The system of claim 1 wherein the PAM transmitter further comprises a DC source coupled to the data lanes.

9. The system of claim 1 wherein the wherein the output waveform comprises PAM4 signals.

10. The system of claim 1 wherein the PAM transmitter is configured to modulate the source data using a set of predetermined formulae involving the α parameter and the β parameter.

11. The system of claim 1 wherein a function of the MSB data XOR the LSB data is modified by the β parameter.

12. The system of claim 1 wherein a function of the MSB data is modified by the α parameter.

13. The system of claim 1 wherein a function of the LSB data is modified by the α parameter.

14. A method for calibrating eye-modulation parameters in a PAM4 communication system, the method comprising:
  retrieving calibration data for determining an α parameter and a β parameter;
  performing PAM4 eye-modulation with four eye levels to generate an output waveform, the four eye levels being separated by a top eye height, a middle eye height, and a bottom eye height;
  measuring the eye heights and signal-to-noise ratios of the output waveform, the signal-to-noise ratios being corresponding to the eye heights;
  adjusting the α parameter to equalize the middle eye height relative to the top eye height and the bottom eye height; and
  adjusting the β parameter to equalize signal-to-noise ratios by changing the top eye height and the bottom eye.

15. The method of claim 14 wherein the bottom eye height comprises a spacing between LSB levels.

16. The method of claim 14 wherein the top eye height comprises a spacing between MSB levels.

17. The method of claim 14 wherein the adjusting the β parameter comprises changing the β parameter until signal-to-noise ratios of the four eye levels are substantially equal.

18. The method of claim 14 wherein the adjusting the α parameter is associated reducing distortion in a data path.

19. A communication system comprising:
  a control module being configured to generate a first control signal for determining an α parameter and a second signal for determining a β parameter, the α parameter and the β parameter being determined based on eye-modulation characteristics, the control module comprising a memory for storing calibration data;
  a PAM4 transmitter being configured to perform eye-modulation on the calibration data and generate an output waveform using the α parameter and the β parameter, the output waveform being modulated with four eye levels, the α parameter being used to adjust a middle eye-height, the β parameter being used to adjust a top eye-height and a bottom eye-height, the calibration data comprising MSB data and LSB data, the output waveform being outputted by an optical driver; and
  a correction module being configured to measure eye-modulation characteristics, the eye-modulation characteristics including distortion and signal-to-noise ratios.

20. The system of claim 19 wherein the top eye-height comprises a spacing between MSB data eye levels and the bottom eye-height comprises a spacing between LSB data eye levels.

* * * * *